United States Patent
Panusopone

(10) Patent No.: US 7,602,848 B2
(45) Date of Patent: Oct. 13, 2009

(54) METHODS AND APPARATUS FOR EFFICIENT GLOBAL MOTION COMPENSATION ENCODING AND ASSOCIATED DECODING

(75) Inventor: Krit Panusopone, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 128 days.

(21) Appl. No.: 10/107,755

(22) Filed: Mar. 26, 2002

(65) Prior Publication Data

US 2003/0202591 A1    Oct. 30, 2003

(51) Int. Cl.
*H04N 7/12* (2006.01)
(52) U.S. Cl. .................................. 375/240.16
(58) Field of Classification Search ............ 375/240.12, 375/240.13, 240.15–240.29; 382/236, 248, 382/107, 284; *H04N 1/66, 7/12*
See application file for complete search history.

(56) References Cited

U.S. PATENT DOCUMENTS

| 5,067,014 | A | * | 11/1991 | Bergen et al. ................ 382/107 |
| 5,473,379 | A | * | 12/1995 | Horne .................... 375/240.16 |
| 5,784,115 | A | * | 7/1998 | Bozdagi ..................... 348/452 |
| 5,959,673 | A | | 9/1999 | Lee et al. |
| 5,982,438 | A | | 11/1999 | Lin et al. |
| 5,999,657 | A | * | 12/1999 | Yasuhiko .................... 382/248 |
| 6,026,195 | A | | 2/2000 | Eifrig et al. |
| 6,037,988 | A | * | 3/2000 | Gu et al. ................. 375/240.16 |
| 6,195,389 | B1 | * | 2/2001 | Rodriguez et al. ...... 375/240.16 |
| 6,205,178 | B1 | * | 3/2001 | Suzuki et al. ........... 375/240.15 |
| 6,205,260 | B1 | | 3/2001 | Crinon et al. |
| 6,249,613 | B1 | * | 6/2001 | Crinon et al. ................ 382/236 |
| 6,526,183 | B1 | * | 2/2003 | Bonnet et al. ................ 382/284 |
| 6,707,854 | B1 | * | 3/2004 | Bonnet et al. .......... 375/240.16 |
| 6,785,331 | B1 | * | 8/2004 | Jozawa et al. .......... 375/240.12 |
| 6,990,145 | B2 | * | 1/2006 | Monro et al. .......... 375/240.12 |
| 7,006,571 | B1 | * | 2/2006 | Nakaya .................. 375/240.16 |

(Continued)

FOREIGN PATENT DOCUMENTS

EP    0 987 898    3/2000

(Continued)

OTHER PUBLICATIONS

Fukunaga et al., "MPEG-4 Video Verification Model version 16.0", ISO/IEC JTC1/SC29/WG11 N3312, Mar. 2000 (380 pages).

(Continued)

*Primary Examiner*—Tung Vo
(74) *Attorney, Agent, or Firm*—Stewart M. Wiener

(57) ABSTRACT

More efficient global motion compensation is provided by merging the warping processes performed in various global motion compensation (GMC) functions into a single warping process for use in GMC encoding and decoding operations. In an encoder in accordance with the invention, a global motion estimation processor is provided for performing global motion estimation (GME) on a picture. A mode decision processor is provided for selecting macroblocks (MBs) of the picture for GMC coding. A warping processor is provided for performing a single warping process for each pixel in the selected MBs for use in a plurality of GMC operations other than GME. A global motion compensation processor is provided for performing the GMC operations. Variable length encoding and texture coding is provided for encoding the picture to produce a GMC encoded bit stream.

29 Claims, 2 Drawing Sheets

U.S. PATENT DOCUMENTS 7,068,720 B2 * 6/2006 Wang et al. ............ 375/240.12

FOREIGN PATENT DOCUMENTS

WO      WO 98/59497      12/1998

OTHER PUBLICATIONS

"MPEG-4 Video Verification Model Version 9.1, Appendix D: Off-Line Sprite Generation", ISO/IEC JTC1/SC29/WG 11 MPEG98/M3100, Feb. 1998 (9 pages).

J. Konrad, et al., "Improved Global Motion Estimation For N3", ISO/IEC JTC1/SC29/WG11 MPEG97/M3096, Feb. 1998 (3 pages).

Gu, et al., "Results Report on N3—Sprite Generation", ISO/IEC JTC1/SC29/WG11 MPEG96/M1350, Sep. 1996 (3 pages).

Bergen, et al., "A Three Frame Algorithm for Estimating Two-Component Image Motion", IEEE Trans. On Pattern Analysis and Machine Intelligence, vol. 14, No. 9, Sep. 1992 (11 pages).

5. Fukunaga, et al., "MPEG-4 Video Verification Model Version 15.0" ISO/IEC JTC1/SC29/WG11 N3093, Dec. 1999 (391 pages).

"Information Technology—Coding of Audiovisual Objects—Part 2: Visual Amendment 1: Visual Extensions," ISO/IEC JTC1/SC29/WG11 N3056, Dec. 1999 (541 Pages).

* cited by examiner

METHODS AND APPARATUS FOR EFFICIENT GLOBAL MOTION COMPENSATION ENCODING AND ASSOCIATED DECODING

BACKGROUND OF THE INVENTION

The present invention relates to the field of encoding and decoding of digital data. More specifically, the present invention relates to methods and apparatus for efficient global motion compensation encoding and associated decoding of digital data.

Global motion compensation (GMC) is a powerful video compression technique. It uses one global parameter to describe the deformation of a current picture from a previous picture (usually caused by camera movement). However, GMC is commonly utilized together with traditional motion coding (MC) methods in compressing real world scenes where there are multiple objects each of which has its own motion. MPEG-4, as described in ISO/IEC 14496-2: 1999/FDAM 1: 2000(E) "Information Technology—Coding of audio-visual objects—Part 2: Visual, Amendment 1: Visual extensions", N 3056 (December, 1999), adopts a similar compression routine. MPEG-4 includes GMC in the Advanced Simple Profile (ASP) (see, e.g., ISO/IEC 14496-2:1999/FDAM 4 "Information Technology—Coding of audio-visual objects—Part 2: Visual, Amendment 4: Streaming video profile" N 3094 (January 2001)).

GMC in MPEG-4 is similar to sprite coding in the sense that both operations calculate a warping parameter for every pixel in the frame based on a single Global Motion Vector (GMV). GMC, however, does not store the sprite piece in the global memory as is done in sprite coding, although the previous anchor frame can be considered a sprite piece in GMC. MPEG-4 allows sprite coding and GMC tools only in S-VOP (a picture that is coded using information obtained by warping whole or part of a static sprite) and up to eight components of the GMV can be transmitted in every S-VOP. As well known in the art, the acronym VOP refers to a "video object plane." A discussion of sprite coding may be found in commonly assigned co-pending patent application Ser. No. 09/587,961 entitled "Global Motion Estimation for Sprite Coding" filed on Jun. 6, 2000.

A main drawback for GMC is its complexity, since for every pixel a warping parameter must be determined and warping must be performed based on a single GMV. "Warping" refers to a processing applied to extract a sprite VOP from a static sprite or a reference VOP. It consists of a global spatial transformation driven by a few motion parameters (0,2,4,6,8), to recover luminance, chrominance and shape information. The warping parameter calculations must be performed at a high precision (up to $\frac{1}{16}$ pixel) to preserve accuracy.

Basic GMC Processing Routine

Operations in GMC encoding can be divided into five main tasks; i.e., estimation of GMV, calculation of matching cost, compensation in the luminance (luma) plane, compensation in the chrominance (chroma) plane and determination of the representative motion vector (MV). Only the last three processes are performed at the decoder. This section will provide a brief description of these processes to serve as a reference for the inventive algorithm described below. This section also describes the warping operation in detail, which is the most complex task among GMC operations.

Global Motion Estimation (GME) is computed before the main coding process (Macroblock (MB) loop). It is the most computationally intensive process in a GMC encoder (e.g., an MPEG-4 ASP encoder). GME determines the forward warping parameter (deforms the current VOP to match the original reference VOP) in the current VOP (which only occurs in sprite coding of an arbitrarily shaped object). GME in MPEG-4 adopts a hierarchical approach with each stage comprising up to 32 iterative steps. The Levenberg Marquadt algorithm, a nonlinear least square method, is used to adjust the warping parameter and minimize the matching error. More details on GME in MPEG-4 are provided in ISO/IEC 14496-2: 1999/FDAM 1: 2000(E) "Information Technology—Coding of audio-visual objects—Part 2 : Visual, Amendment 1: Visual extensions", N 3056 (December, 1999) and in S. Fukunaga, Y. Nakaya, S. H. Son, T. Nagumo, "MPEG-4 Video Verification Model Version 15.0", ISO/IEC JTC1/SC29/WG11 N3093 (December 1999).

Calculation of matching cost for mode decision is performed in the ME routine for every MB. Warped coefficients in the reconstructed reference VOP are selected for all coding pixels based on the warping parameter determined in GME. Similar to other ME methods in MPEG-4, SAD (sum of absolute difference) is adopted as a matching criteria in GMC. SAD from GMC with a proper bias is compared against the lowest SAD of the remaining MC modes and the mode (local or global) which gives the lowest overall SAD is chosen. Specification of the MPEG-4 mode decision can be found in S. Fukunaga, Y. Nakaya, S. H. Son, T. Nagumo, "MPEG-4 Video Verification Model Version 15.0", ISO/IEC JTC1/SC29/WG11 N3093 (December 1999) and in the aforementioned co-pending patent application Ser. No. 09/587, 961. Compensation in the luma plane is performed in the MC routine for every GMC selected MB. The encoder finds warped coefficients (which may not be the pixel at a full pel position) from the reconstructed reference VOP and stores them in the predicted MB. This predicted MB is subtracted from the coding MB to form a residual MB and the predicted MB together with the quantized residual MB forms the reconstructed current VOP. Compensation in the chroma plane also serves a similar purpose although the dimension of the warped parameter is reduced by half.

Determination of the representative MV can be done anywhere after the MC process and before the end of that MB coding routine. This process does not have any impact on the coding of the current MB. It is, however, necessary to have a representative MV so that the neighboring MB can use it as a predictor. This task basically calculates the MV of every pixel in the GMC selected MB and then finds an average from those MVs. This representative MV is quantized into either half or quarter pel accuracy following the accuracy of the local MV. The warping process is the key operation of all GMC tasks. Most GMC tasks require backward warping. However, GME calculates the warping parameter for an S-VOP using forward warping according to the following equations:

$$x' = \frac{ax+by+c}{gx+hy+1}$$

$$y' = \frac{dx+ey+f}{gx+hy+1}$$

where (x', y') is the coordinate in the previous anchor VOP, (x,y) is the coordinate in the current VOP and {a,b,c,d,e,f,g,h} are the components of the warping parameter (g and h are fixed to 1 for GMC).

The main concept of the backward warping process is to compute the location of the corresponding point in the reference VOP (applies inverse GMV) for every pixel in the GMC encoded MB. The warping process starts with reference point decoding which warps zero to three reference points (each corner of VOP) depending on the warping model employed. When the warping point is larger than one, the corresponding location of the reference point in the reference VOP includes both real and virtual components. Precision of both components is limited to 1/16 pel.

The next step in the warping process is to find a corresponding point for the starting pixel (top left position) of the GMC coded MB and to find spacing factors for horizontal and vertical directions. The warped reference points are used to compute the spacing factors, which specify the distance between the adjacent pixel after being warped. With the location of the corresponding starting pixel in the reference VOP, the location of other pixels is found by adding appropriate spacing factors. Precision of pixel location in the reference VOP is limited to 1/16 pixel.

As is clear from the above, the GMC processing routine is quite complex. In order to reduce the complexity, it would be advantageous to combine redundant processing functions in various GMC operations. It would be further advantageous to provide a single warping process for use in a variety of GMC operations (other than GME) in order to increase processing efficiency and speed. It would also be advantageous to provide such improvements without any quality degradation.

The methods and apparatus of the present invention provide the foregoing and other advantages.

SUMMARY OF THE INVENTION

The present invention relates to global motion compensation. In particular, the present invention provides for more efficient global motion compensation by merging the warping processes performed in various global motion compensation functions into a single warping process for each pixel for use in global motion compensation of that pixel.

The invention may be implemented in an encoder for efficient global motion compensation (GMC) for encoding of a picture. A global motion estimation processor is provided for performing global motion estimation (GME) on the picture, which is obtained from a video input which is to be encoded at the encoder. A mode decision processor is provided for selecting macroblocks (MBs) of the picture for GMC coding. A warping processor is provided for performing a single warping process for each pixel in the selected MBs for use in a plurality of GMC operations other than GME. A global motion compensation processor is provided for performing the GMC operations. An encoder is provided for encoding (including, e.g., variable length encoding and texture coding) the picture to produce a GMC encoded bit stream.

The invention may be implemented in a decoder for efficient GMC operations for decoding of a picture. A GMC encoded bit stream is received at the decoder in a conventional manner. A variable length decoder is provided for variable length decoding of the bit stream to recover pixel information for MBs of the picture. A warping processor performs a single warping process for each pixel in GMC coded MBs of the picture for use in a plurality of GMC decoding operations. A GMC processor is provided for performing the GMC decoding operations on the GMC coded MBs to provide a reconstructed picture.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It should be understood that various changes may be made in the function and arrangement of elements without departing from the spirit and scope of the invention as set forth in the appended claims.

A common task that is implemented in all GMC processes is the warping process. All processes except GME use a backward warping process to find the corresponding location or movement of every pixel in the GMC coded MB. More importantly, most operations in the warping process among different GMC routines are very similar. Hence, the warping process for four GMC operations; i.e., calculation of matching cost, compensation in the luma plane, compensation in the chroma plane and determination of the representative MV, can be combined, resulting in an increase in processing efficiency and a decrease in processing time without substantially reducing video quality. More savings may be obtained by performing the set-up process (determining the spacing factor) right after GME since it is independent of the location of the pixel.

Figure 1:
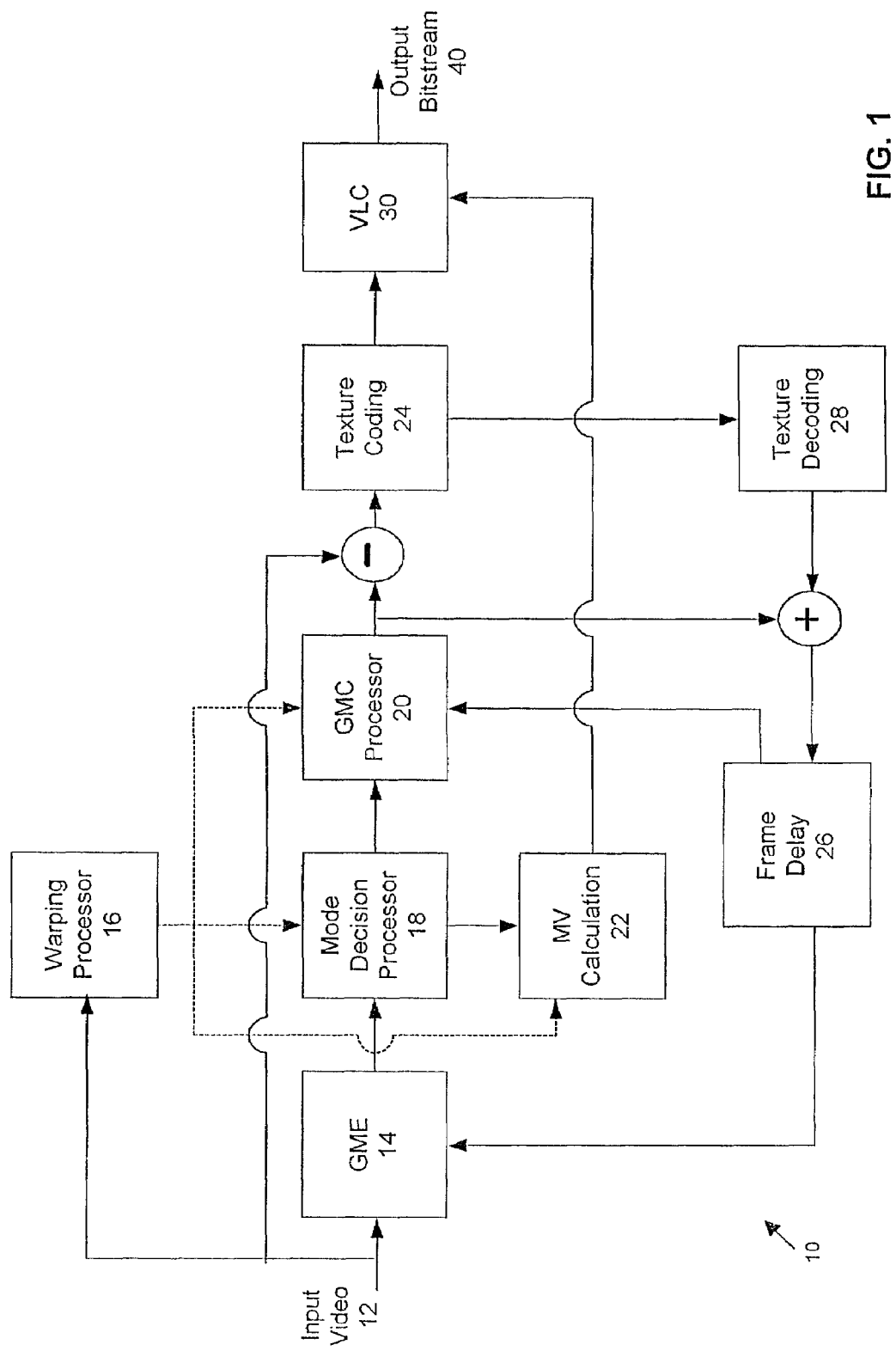
FIG. 1 shows a block diagram example of an encoder in accordance with the invention.

FIG. 1 shows an example embodiment of an encoder 10 which provides efficient global motion compensation (GMC) for encoding pictures in accordance with the present invention. A global motion estimation processor 14 is provided for performing global motion estimation (GME) on a picture obtained from a video input 12. A mode decision processor 18 is provided for selecting macroblocks (MBs) of the picture for GMC coding. A warping processor 16 is provided for performing a single warping process for each pixel in the selected MBs for use in a plurality of GMC operations other than GME. A global motion compensation processor 20 is provided for performing the GMC operations. An encoder (including e.g., a variable length encoder (VLC) 30 and texture coding 24 ) is provided for encoding the picture to produce a GMC encoded bit stream 40.

Motion vectors for use in encoding the picture may be calculated (e.g., at motion vector calculation 22) based on output from the mode decision processor 18 and the warping processor 16. The mode decision processor 18 determines which motion compensation mode will be used to encode each MB of the picture. This determination is based on a calculation of matching costs of each MB for each mode.

Frame delay 26, texture coding 24, texture decoding 28, and variable length encoding 30 operations are shown in FIG. 1 for completeness. These functions are known in the art and are not material to the present invention.

The plurality of GMC operations may comprise at least two of: (i) calculation of matching costs for mode decision; (ii) compensation in luma plane; (iii) compensation in chroma plane; and (iv) determination of a representative motion vector.

For example, the plurality of GMC operations may comprise calculating each of (i) matching costs for mode decision, (ii) compensation in luma plane, (iii) compensation in chroma plane, and (iv) determination of a representative motion vector.

The processes of calculating matching cost and compensation in the luma plane share most operations and can be combined seamlessly. Once the predicted MB (based on the corresponding warped position) is generated, its matching cost can be easily found. However, calculation of matching cost needs to be done in every MB while compensation in the luma plane is only required in the GMC coded MBs. The penalty of this combination is very small, since the primary effect of keeping the predicted MB around is simply a requirement for extra memory. To minimize this impact, the encoder 10 may determine the predicted MB when it determines the coding mode and store this predicted MB for use in traditional (non-global) motion compensation (MC) of the picture. For example, the predicted MB may be stored in the same location as the memory that will keep the predicted MB when using local MVs. In the MC process, all GMC coded MBs can skip MC since the predicted MB has already been updated.

The combination of the calculation of matching cost and determination of the representative MV is somewhat similar to that described above. Once the location of the warped pixel is found, determination of the representative MV is accomplished by finding a displacement of this location from the original location (instead of finding its content). A trade off of this merging is similar to that discussed above. All displacement calculations and their average for the MB that does not use GMC are wasted calculations.

The combination of compensation in luma and determination of the representative MV does not incur any penalty since both of these processes are required only in GMC coded MBs.

The combination of compensation in the luma plane and compensation in the chroma plane is also beneficial since these operations are very similar. In fact, the location of the warped pixel in the chroma plane is half of its corresponding warped pixel in the luma plane. This combination therefore does not produce any penalty.

The warping process performed by the warping processor 16 may comprise determining a warping parameter for the picture during GME. A location of corresponding warped pixels in a reconstructed reference video object plane (VOP) may then be determined based on the warping parameter. Predicted MBs may be generated based on the warped pixels.

Prior to the warping, a spacing factor may be determined which identifies a distance between adjacent pixels after warping.

The warping process performed by the warping processor 16 may comprise determining a warped location of a warped pixel. A spacing factor can then be determined between the warped location of the warped pixel and an original location of a corresponding original pixel. The warped pixel may be subtracted from the original pixel to determine a matching cost. The warped pixel may be stored for use in the GMC operations, such as calculation of matching costs, compensation in the luma plane, and determination of a representative motion vector.

The picture may comprise either a video frame or a video field. The GMC may comprise MPEG-4 GMC, or similar types of GMC.

Figure 2:
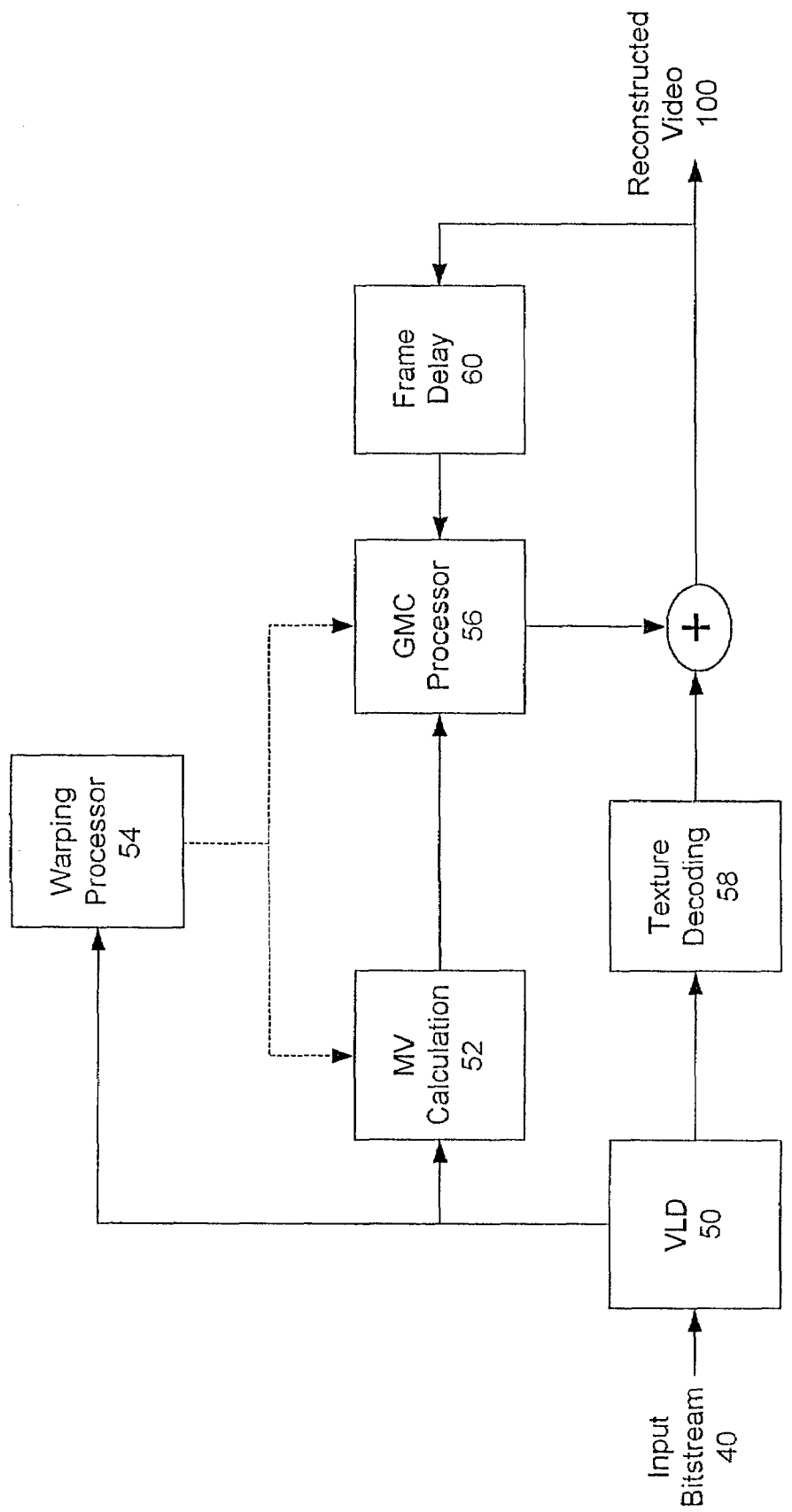
FIG. 2 shows a block diagram example of a decoder in accordance with the invention.

FIG. 2 shows an example embodiment of a decoder 45 that provides efficient global motion compensation (GMC) for decoding a picture in accordance with the present invention. A GMC encoded bit stream 40 is received at decoder 45 in a conventional manner. A variable length decoder (VLD) 50 is provided for variable length decoding of the bit stream to recover pixel information for macroblocks (MBs) of a picture. A warping processor 54 performs a single warping process for each pixel in GMC coded MBs of the picture for use in a plurality of GMC decoding operations. A GMC processor 56 is provided for performing the GMC decoding operations on the GMC coded MBs to provide a reconstructed picture 100.

Frame delay 60, variable length decoding 50, and texture decoding 58 operations are shown in FIG. 2 for completeness. These functions are known in the art and are not material to the present invention.

The plurality of GMC decoding operations performed by the GMC processor 56 may comprise at least two of: (i) compensation in the luma plane; (ii) compensation in the chroma plane; and (iii) determination of a representative motion vector. The benefits and disadvantages of various combinations of these operations are described above in connection with FIG. 1.

Prior to the warping, a spacing factor may be determined which identifies a distance between adjacent pixels after warping.

The warping process performed by the warping processor 54 may comprise determining a warped location of a warped pixel. A spacing factor between the warped location of the warped pixel and an original location of a corresponding original pixel can be determined. The warped pixel can be stored for use in the GMC decoding operations, such as compensation in the luma plane and determination of a representative motion vector.

The picture may comprise either a video frame or a video field. The GMC may comprise MPEG-4 GMC, or similar types of GMC.

Corresponding encoding and decoding methods are also provided in accordance with the invention.

Those skilled in the art will appreciate that the Figures show only those operations necessary for GMC coding and decoding, and that the operations necessary for other encoding and decoding modes are not shown, as they are not material to the present invention.

Simulations have been performed in an encoder in accordance with the invention (referred to herein as the "simulation encoder") utilizing a common warping function for GMC which replaces the separate warping functions of the following three routines: (i) calculation of the matching cost, (ii) compensation in the luma plane, (iii) and determination of the representative MV. This simulation encoder produces identical bitstreams to those generated by the Microsoft reference encoder (Microsoft-fpdam1-1.0-000703) at any GMC configuration. This common routine is called from the frame_ME function for every MB in the S-VOP, and shares the set up operation (finding the warped location of the starting pixel and the spacing factor). Inside the pixel loop, the common routine will retrieve the warped pixel, find a displacement between the location of the warped pixel and the original location (in order to find the representative MV), subtract the warped pixel from the original pixel (in order to find matching cost) and store the warped pixel in the memory (for MC).

The simulation encoder also implemented conventional GMC operations to provide a benchmark. Simulations have been performed on both platforms (i.e. the simulation encoder and the Microsoft reference encoder) with various GMC conditions. This experiment was conducted on Pentium III 450 MHz based personal computer. All tests are on the first 15 VOPs of the MPEG-4 test sequence "Stefan" (i.e. one I-VOP and fourteen S-VOPs) with no other tools used (fast search and MV precision is limited to half pel).

To understand the efficiency of the present invention, profiling data of both implementations are shown in Tables 1-8. Table 9 also shows the same data but narrows the function to those relevant to the inventive modifications. Row 2 of Table 9 is the combined time from Rows 3 to 5 of Table 9 and these routines are comparable to the new common function.

TABLE 1

Top ten most time consuming processes when encoding with GMC (inventive implementation, 3 warping points)

| Process | Func. Time | Total Time | Hit Count |
|---|---|---|---|
| AffineGME | 22211 (75.7) | 22416 (76.3) | 14 |
| FastAffineWarp | 1213 (4.1) | 2009 (6.8) | 5544 |
| CinterpolatePixelV | 832 (2.8) | 832 (2.8) | 1806592 |
| Dist1_8x8 | 701 (2.4) | 701 (2.4) | 274908 |
| Fdct_NoMMX | 576 (2.0) | 576 (2.0) | 35640 |
| BlockQuantMPEG | 285 (1.0) | 296 (1.0) | 35640 |
| Dist1 | 222 (0.8) | 222 (0.8) | 47960 |
| FastAffineWarpC | 212 (0.7) | 457 (1.6) | 3026 |
| Putpict | 170 (0.6) | 6409 (21.8) | 15 |

TABLE 2

Computation time of selected processes when encoding with GMC (benchmark, 3 warping points)

| Process | Func. Time | Total Time | Hit Count |
|---|---|---|---|
| AffineGME | 22224 (73.9) | 22427 (74.5) | 14 |
| CinterpolatePixelV | 1359 (4.5) | 1359 (4.5) | 2580864 |
| FastAffine_SAD | 749 (2.5) | 1729 (5.7) | 5544 |
| Dist1_8x8 | 714 (2.4) | 714 (2.4) | 274984 |
| Fdct_NoMMX | 577 (1.9) | 577 (1.9) | 35640 |
| FastAffine_MC | 356 (1.2) | 763 (2.5) | 3025 |
| BlockQuantMPEG | 277 (0.9) | 289 (1.0) | 35640 |
| FastAffineWarpC | 208 (0.7) | 453 (1.5) | 3025 |
| Idctrow | 187 (0.6) | 187 (0.6) | 285120 |
| Putpict | 171 (0.6) | 7109 (23.6) | 15 |
| Idctcol | 166 (0.6) | 166 (0.6) | 285120 |
| FastAffine_MV | 74 (0.2) | 147 (0.5) | 3025 |

TABLE 3

Top ten most time consuming processes when encoding with GMC (inventive implementation, 2 warping points)

| Process | Func. Time | Total Time | Hit Count |
|---|---|---|---|
| IsotropicGME | 14453 (67.3) | 14648 (64.2) | 14 |
| FastAffineWarp | 1137 (5.3) | 1823 (8.5) | 5544 |
| CinterpolatePixelV | 764 (3.6) | 764 (3.6) | 1785984 |
| Dist1_8x8 | 702 (3.3) | 702 (3.3) | 275444 |
| Fdct_NoMMX | 576 (2.7) | 576 (2.7) | 35640 |
| BlockQuantMPEG | 283 (1.3) | 296 (1.4) | 35640 |
| BitstreamPutBit | 249 (1.2) | 343 (1.6) | 205879 |
| Dist1 | 221 (1.0) | 221 (1.0) | 47487 |
| FastAffineWarpC | 205 (1.0) | 398 (1.9) | 2865 |
| Putpict | 172 (0.8) | 6289 (29.3) | 15 |

TABLE 4

Computation time of selected processes when encoding with GMC (benchmark, 2 warping points)

| Process | Func. Time | Total Time | Hit Count |
|---|---|---|---|
| IsotropicGME | 15652 (63.2) | 15908 (64.2) | 14 |
| CinterpolatePixelV | 1660 (6.7) | 1660 (6.7) | 2525568 |
| Dist1_8x8 | 795 (3.2) | 795 (3.2) | 275124 |
| FastAffine_SAD | 779 (3.1) | 1841 (7.4) | 5544 |
| Fdct_NoMMX | 602 (2.4) | 602 (2.4) | 35640 |
| FastAffine_MC | 460 (1.9) | 938 (3.8) | 2881 |
| BlockQuantMPEG | 307 (1.2) | 320 (1.3) | 35640 |
| FastAffineWarpC | 261 (1.1) | 559 (2.3) | 2881 |
| BitstreamPutBit | 240 (1.0) | 379 (1.5) | 205617 |
| FastAffine_MV | 70 (0.3) | 139 (0.6) | 2881 |

TABLE 5

Computation time of selected processes when encoding with GMC (inventive implementation, 1 warping points)

| Process | Func. Time | Total Time | Hit Count |
|---|---|---|---|
| TranslationalGME | 11915 (65.6) | 12107 (66.6) | 14 |
| CinterpolatePixelV | 899 (5.0) | 899 (5.0) | 1519584 |
| Dist1_8x8 | 706 (3.9) | 706 (3.9) | 276948 |
| Fdct_NoMMX | 575 (3.2) | 575 (3.2) | 35640 |
| FastTranlationWarp | 441 (2.4) | 1238 (6.8) | 5544 |
| BlockQuantMPEG | 283 (1.6) | 295 (1.6) | 35640 |
| Dist1 | 224 (1.2) | 224 (1.2) | 48163 |
| BitstreamPutBit | 176 (1.0) | 281 (1.5) | 217462 |
| Putpict | 166 (0.9) | 5509 (30.3) | 15 |
| TranlationalWarpC | 118 (0.7) | 220 (1.2) | 1565 |

TABLE 6

Computation time of selected processes when encoding with GMC (benchmark, 1 warping points)

| Process | Func. Time | Total Time | Hit Count |
|---|---|---|---|
| TranlationalGME | 11897 (63.9) | 12090 (64.9) | 14 |
| CinterpolatePixelV | 1034 (5.6) | 1034 (5.6) | 2023040 |
| Dist1_8x8 | 718 (3.9) | 718 (3.9) | 276948 |
| Translation_SAD | 576 (3.1) | 1273 (6.8) | 5544 |
| Fdct_NoMMX | 574 (3.1) | 574 (3.1) | 35640 |
| BlockQuantMPEG | 281 (1.5) | 293 (1.6) | 35640 |
| Dist1 | 227 (1.2) | 227 (1.2) | 48163 |
| BitstreamPutBit | 182 (1.0) | 304 (1.6) | 217462 |
| Translation_MC | 128 (0.7) | 354 (1.9) | 1576 |
| TranslationWarpC | 98 (0.5) | 209 (1.1) | 1565 |
| Translation_MV | 1.8 (0.0) | 1.8 (0.0) | 1576 |

TABLE 7

Computation time of selected processes when encoding with GMC (inventive implementation, 0 warping points)

| Process | Func. Time | Total Time | Hit Count |
|---|---|---|---|
| Dist1_8x8 | 705 (14.6) | 705 (14.6) | 276432 |
| Fdct_NoMMX | 592 (12.3) | 592 (12.3) | 35640 |
| BlockQuantMPEG | 279 (5.8) | 289 (6.0) | 35640 |
| Dist1 | 230 (4.8) | 230 (4.8) | 48566 |
| BitstreamPutBit | 202 (4.2) | 293 (6.1) | 217613 |
| Idctco1 | 189 (3.9) | 189 (3.9) | 285120 |
| Putpict | 169 (3.5) | 4274 (88.7) | 15 |
| Idct_NoMMX | 154 (3.2) | 490 (10.2) | 35640 |
| Idctrow | 146 (3.0) | 146 (3.0) | 285120 |
| FastStationaryWarp | 62 (1.3) | 62 (1.3) | 5544 |
| StationaryWarpC | 5.3 (0.1) | 5.3 (0.1) | 1194 |

TABLE 8

Computation time of selected processes when encoding with GMC
(benchmark, 0 warping points)

| Process | Func. Time | Total Time | Hit Count |
|---|---|---|---|
| Dist1_8x8 | 713 (15.1) | 713 (15.1) | 276432 |
| Fdct_NoMMX | 577 (12.2) | 577 (12.2) | 35640 |
| BlockQuantMPEG | 282 (6.0) | 293 (6.2) | 35640 |
| Dist1 | 227 (4.8) | 227 (4.8) | 48566 |
| BitstreamPutBit | 172 (3.6) | 294 (6.2) | 217613 |
| Stationary_SAD | 30 (0.6) | 30 (0.6) | 5544 |
| StationaryWarpC | 5.2 (0.1) | 5.2 (0.1) | 1194 |
| Stationary_MC | 4.7 (0.1) | 4.7 (0.1) | 1198 |

TABLE 9

Comparison of the computation time in GMC tasks
(Func. Time/Total Time)

| Process | 0 Point | 1 Point | 2 Points | 3 Points |
|---|---|---|---|---|
| Inventive Combination | 62/62 | 441/1238 | 1137/1823 | 1213/2009 |
| SAD + MC + MV | 34.7/34.7 | 705/1628 | 1309/2918 | 1179/2639 |
| SAD | 30/30 | 576/1273 | 779/1841 | 749/1729 |
| MC | 4.7/4.7 | 128/354 | 460/938 | 356/763 |
| MV | N.A. | 1.8/1.8 | 70/139 | 74/147 |

It is obvious from Table 9 that a higher gain is achieved when using two or three points and the gain is minimal for zero points since warping is not required. The saving differs from VOP to VOP depending on how many MBs use GMC coding. An incremental savings is expected when combining compensation in the chroma plane in the common function. This approach is also applicable in a decoder (e.g., compensation in the luma plane, compensation in the chroma plane and determination of the representative MV can be combined) to speed up the GMC decoding operations.

It should now be appreciated that the present invention provides advantageous methods and apparatus for efficient global motion compensation when encoding and decoding digital data. The invention uses a common function to provide a shared operation (i.e. the warping function) for most GMC tasks. This merging of the functions into a single, common function, does not effect the internal computation precision and output. The penalty of this implementation is small and occurs only when a macroblock does not use GMC coding of GMC operations.

Although the invention has been described in connection with various illustrated embodiments, numerous modifications and adaptations may be made thereto without departing from the spirit and scope of the invention as set forth in the claims.

What is claimed is:

1. A method for providing video compression using global motion compensation (GMC) to encode a picture, comprising the steps of:
    performing global motion estimation (GME) on the picture;
    determining a warping parameter for the picture during GME;
    selecting macroblocks (MBs) of said picture for GMC coding;
    performing a single warping process for each pixel in the selected MBs using said warping parameter, where processes of a plurality of GMC operations other than GME are combined to include at least two of:
        calculating matching costs for a mode decision,
        calculating compensation in a luma plane,
        calculating compensation in a chroma plane, and
        calculating determination of a representative motion vector;
    encoding said picture to produce a GMC encoded bit stream; and
    wherein said warping process comprises:
        determining said warping parameter for the picture during GME;
        determining the location of corresponding warped pixels in a reconstructed reference video object plane (VOP) based on said warping parameter; and
        generating predicted MBs based on said warped pixels, wherein said predicted MBs are generated at a time when an encoding mode decision is made, and said predicted MBs are stored for use in a non-global motion compensation process;
    wherein said predicted MBs are generated by a warping processor and the combined processes of a plurality of GMC operations other than GME are performed by a mode decision processor for selecting macroblocks (MBs) of the picture for GMC coding, a GMC processor for performing at least some of the GMC operations, and a motion vector calculator for calculating motion vectors for use in encoding the picture, wherein the predicted MBs generated by the warping processor are provided as inputs to the mode decision processor, the GMC processor and the motion vector calculator.

2. A method in accordance with claim 1, wherein said plurality of GMC operations comprises at least two of: (i) calculation of matching costs for mode decision; (ii) compensation in a luma plane; (iii) compensation in a chroma plane; and (iv) determination of a representative motion vector.

3. A method in accordance with claim 1, wherein said plurality of GMC operations comprises calculation of matching costs for mode decision, compensation in a luma plane, compensation in a chroma plane, and determination of a representative motion vector.

4. A method in accordance with claim 1, further comprising: determining, prior to said warping, a spacing factor which identifies a distance between adjacent pixels after warping.

5. A method in accordance with claim 1, wherein said warping process comprises:
    for each of the warped pixels,
        determining a spacing factor between the warped location of the warped pixel and an original location of a corresponding original pixel;
        subtracting the warped pixel from said original pixel to determine a matching cost; and
        storing said warped pixel for use in said GMC operations.

6. A method in accordance with claim 5, wherein said plurality of GMC operations comprises calculation of matching costs, compensation in a luma plane, and determination of a representative motion vector.

7. A method in accordance with claim 1, wherein said picture comprises one of a video frame or a video field.

8. A method in accordance with claim 1, wherein said GMC comprises MPLG-4 GMC.

9. A method for decoding a global motion compensation (GMC) encoded bit stream carrying compressed video data, comprising the steps of:
    variable length decoding said GMC encoded bit stream to recover pixel information for macroblocks (MBs) of a picture;
    determining a single warping process for the picture;

performing a single warping process for each pixel in GMC coded MBs of said picture using said warping parameter, where processes of a plurality of GMC decoding operations are combined to include at least two of:
calculating matching costs for a mode decision,
calculating compensation in a luma plane,
calculating compensation in a chroma plane, and
calculating a representative motion vector; and
decoding said GMC coded MBs in accordance with said warping process to provide a reconstructed picture; and
wherein said warping process comprises, for each of the warped pixels, determining a warped location of the warped pixel, determining a spacing factor between the warped location of the warped pixel and an original location of a corresponding original pixel, and storing said warped pixel for use in said GMC decoding operations;
wherein said warped pixels are generated by a warping processor and the combined processes of a plurality of GMC decoding operations are performed by a GMC processor for performing at least some of the GMC decoding operations and a motion vector calculator for calculating motion vectors for use in decoding the picture, wherein the warped pixels generated by the warping processor are provided as inputs to the GMC processor and the motion vector calculator.

10. A method in accordance with claim 9, wherein said plurality of GMC decoding operations comprises at least two of: (i) compensation in a luma plane; (ii) compensation in a chroma plane; and (iii) determination of a representative motion vector.

11. A method in accordance with claim 9, wherein said plurality of GMC decoding operations comprises compensation in a luma plane, compensation in a chroma plane, and determination of a representative motion vector.

12. A method in accordance with claim 9, further comprising: determining, prior to said warping, a spacing factor which identifies a distance between adjacent pixels after warping.

13. A method in accordance with claim 9, wherein said plurality of GMC decoding operations comprises compensation in a luma plane and determination of a representative motion vector.

14. A method in accordance with claim 9, wherein said picture comprises one of a video frame or a video field.

15. A method in accordance with claim 9, wherein said GMC comprises MPLG-4 GMC.

16. Apparatus for encoding a picture using global motion compensation (GMC), comprising:
global motion estimation processor for performing global motion estimation (GME) on the picture and determining a warping parameter for said picture;
a mode decision processor for selecting macroblocks (MBs) of said picture for GMC coding;
a warping processor for performing a single warping process for each pixel in the selected MBs using said warping parameter, where processes of a plurality of GMC operations other than GME are combined to include at least two of:
calculating matching costs for a mode decision,
calculating compensation in a luma plane,
calculating compensation in a chroma plane, and
calculating a representative motion vector;
a global motion compensation processor for performing at least some of said GMC operations;
an encoder responsive to said global motion compensation processor for encoding said picture to produce a GMC encoded bit stream; and
wherein said warping process comprises:
determining said warping parameter for the picture during GME;
determining the location of corresponding warped pixels in a reconstructed reference video object plane (VOP) based on said warping parameter; and
generating predicted MBs based on said warped pixels, wherein said predicted MBs are generated at a time when an encoding mode decision is made, and said predicted MBs are stored for use in a non-global motion compensation process;
the apparatus further comprising a motion vector calculator for calculating motion vectors for use in encoding the picture, wherein said predicted MBs are generated by the warping processor and provided as inputs to the mode decision processor, the GMC processor and the motion vector calculator.

17. Apparatus in accordance with claim 16, wherein said plurality of GMC operations comprises at least two of: (i) calculation of matching costs for mode decision; (ii) compensation in a luma plane; (iii) compensation in a chroma plane; and (iv) determination of a representative motion vector.

18. Apparatus in accordance with claim 16, wherein said plurality of GMC operations comprises calculation of matching costs for mode decision, compensation in a luma plane, compensation in a chroma plane, and determination of a representative motion vector.

19. Apparatus in accordance with claim 16, wherein: prior to said warping, a spacing factor is determined which identifies a distance between adjacent pixels after warping.

20. Apparatus in accordance with claim 16, wherein said warping process comprises: for each of the warped pixels, determining a spacing factor between the warped location of the warped pixel and an original location of a corresponding original pixel; subtracting the warped pixel from said original pixel to determine a matching cost; and storing said warped pixel for use in said GMC operations.

21. Apparatus in accordance with claim 20, wherein said plurality of GMC operations comprises calculating matching costs, compensation in a luma plane, and determination of a representative motion vector.

22. Apparatus in accordance with claim 16, wherein said GMC comprises MPLG-4 GMC.

23. Apparatus for decoding a global motion compensation (GMC) encoded bit stream carrying compressed video data, comprising:
a variable length decoder for variable length decoding said GMC encoded bit stream to recover pixel information for macroblocks (MBs) of a picture, including a warping parameter for the picture;
a warping processor for performing a single warping process for each pixel in GMC coded MBs of said picture using said warping parameter, where processes of a plurality of GMC decoding operations are combined to include at least two of:
calculating matching costs for a mode decision,
calculating compensation in a luma plane,
calculating compensation in a chroma plane, and
calculating determination of a representative motion vector;
a GMC processor for performing at least some of said GMC decoding operations on said GMC coded MBs to provide a reconstructed picture; and
wherein said warping process comprises, for each of the warped pixels, determining a warped location of the warped pixel, determining a spacing factor between the warped location of the warped pixel and an original location of a corresponding original pixel, and storing said warped pixel for use in said GMC decoding operations;

the apparatus further comprising a motion vector calculator for calculating motion vectors for use in decoding the picture, wherein said warped pixels are generated by said warping processor and provided as inputs to the GMC processor and the motion vector calculator.

24. Apparatus in accordance with claim 23, wherein said plurality of GMC decoding operations comprises at least two of: (i) compensation in a luma plane; (ii) compensation in a chroma plane; and (iii) determination of a representative motion vector.

25. Apparatus in accordance with claim 23, wherein said plurality of GMC decoding operations comprises compensation in a luma plane, compensation in a chroma plane, and determination of a representative motion vector.

26. Apparatus in accordance with claim 23, wherein: prior to said warping, a spacing factor is determined which identifies a distance between adjacent pixels after warping.

27. Apparatus in accordance with claim 23, wherein said plurality of GMC decoding operations comprises compensation in a luma plane and determination of a representative motion vector.

28. Apparatus in accordance with claim 23, wherein said picture comprises one of a video frame or a video field.

29. Apparatus in accordance with claim 23, wherein said GMC comprises MPLG-4 GMC.

* * * * *